(No Model.) 2 Sheets—Sheet 1.
A. G. HENERY.
FOLDING CANOPY COVER FOR VEHICLE SEATS.
No. 573,974. Patented Dec. 29, 1896.
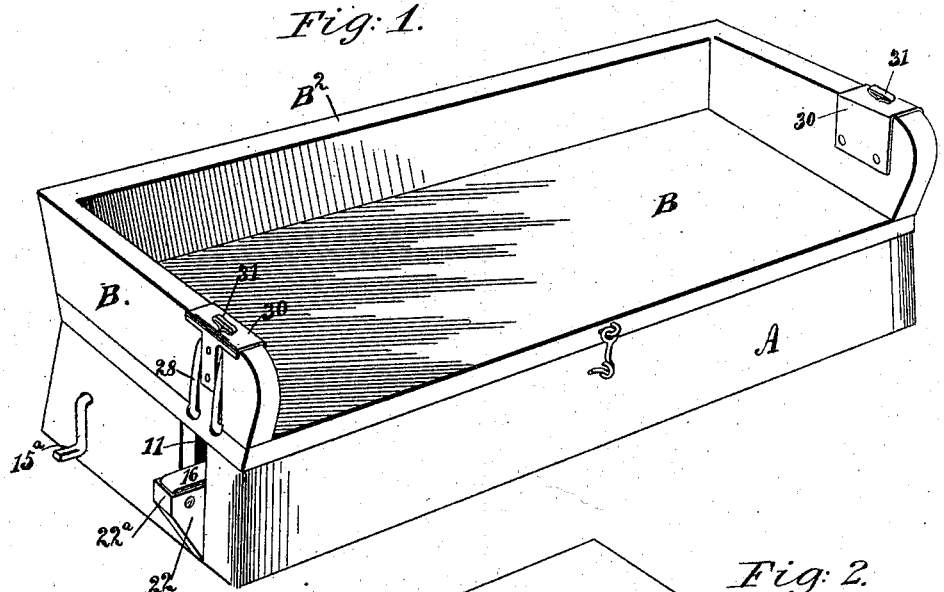
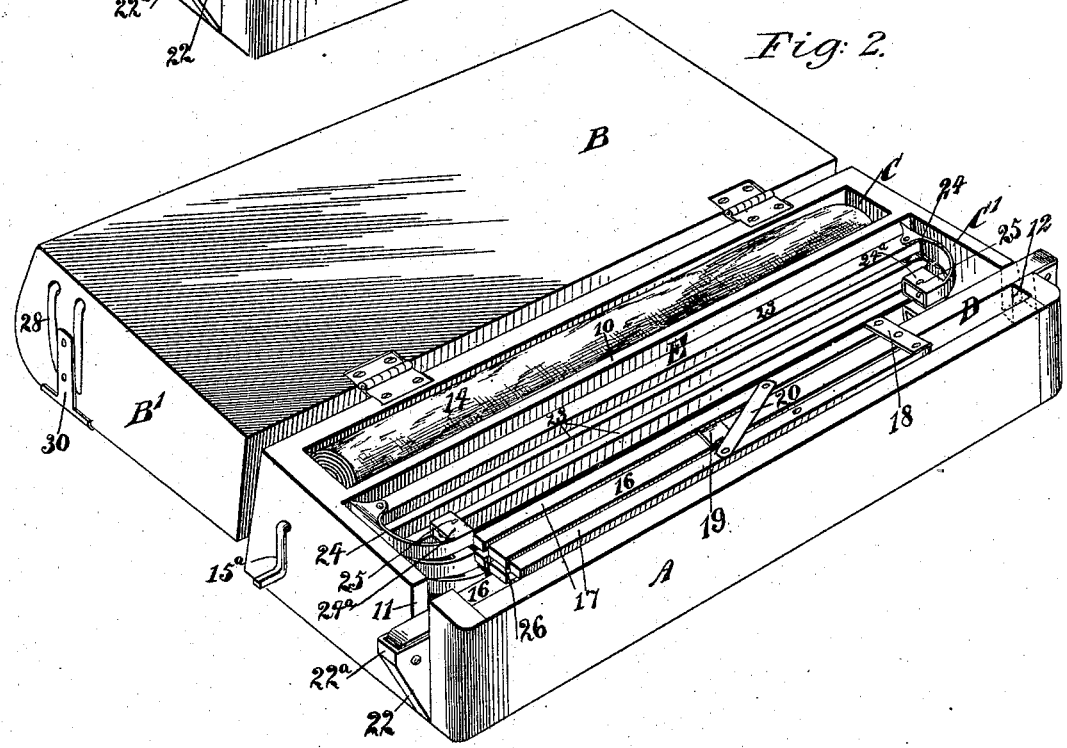
WITNESSES:
INVENTOR
A. G. Henery.
BY
ATTORNEYS.

(No Model.) 2 Sheets—Sheet 2.
A. G. HENERY.
FOLDING CANOPY COVER FOR VEHICLE SEATS.
No. 573,974. Patented Dec. 29, 1896.
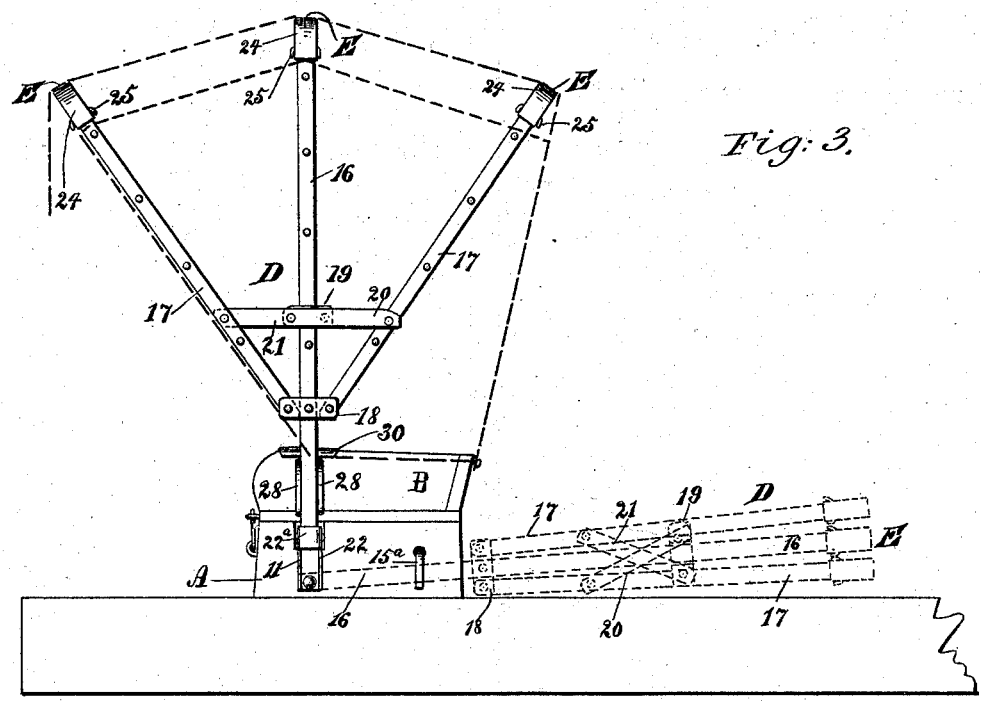
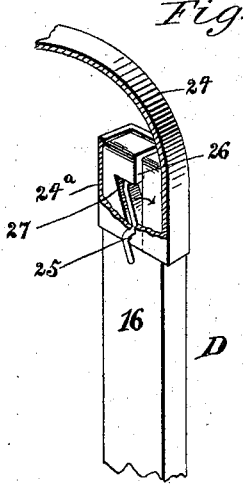
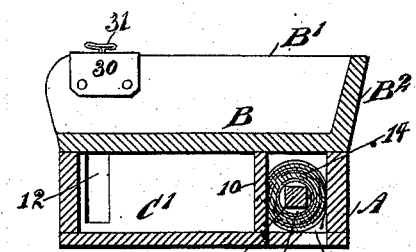
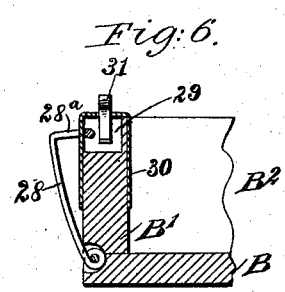
WITNESSES:
INVENTOR
A. G. Henery.
BY
ATTORNEYS.

UNITED STATES PATENT OFFICE.

ALVANES GRANT HENERY, OF MALTA, OHIO, ASSIGNOR OF ONE-HALF TO JAMES B. NAYLOR AND AUSTIN A. COULSON, OF SAME PLACE.

FOLDING CANOPY-COVER FOR VEHICLE-SEATS.

SPECIFICATION forming part of Letters Patent No. 573,974, dated December 29, 1896.

Application filed April 23, 1896. Serial No. 588,732. (No model.)

*To all whom it may concern:*

Be it known that I, ALVANES GRANT HENERY, of Malta, in the county of Morgan and State of Ohio, have invented a new and Improved Vehicle-Seat and Canopy-Cover to Fold into the Same, of which the following is a full, clear, and exact description.

My invention relates to seats and canopy-covers for vehicles.

The invention has for its object to so construct the seat that the top or cover may be folded into the seat when not in use, thereby providing a top or cover to be always at hand and which when not needed will be entirely out of the way of the occupant of the seat and also perfectly concealed.

Another object of the invention is to provide a means for detachably connecting the sections of the canopy or top and provide for the holding of its members one upon the other.

Another object of the invention is to provide a seat which, in addition to receiving the canopy or top in a folded state, will be also provided with a compartment containing a roller, upon which roller a tarpaulin or equivalent cover may be rolled, so that the said cover will be always at hand when required for use.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 1 is a perspective view of the improved seat closed and in position for use. Fig. 2 is a perspective view of the seat in which the cover or seating-section is opened out from its base, the vehicle top or canopy for the seat, together with a tarpaulin, being illustrated as stored therein. Fig. 3 is a side elevation of the improved seat and the vehicle top or canopy in position over the seat, the top being shown as folded back in dotted lines. Fig. 4 is a perspective view, partially in section, of a portion of the top or canopy, illustrating the manner in which the canopy-ribs are detachably attached to the canopy-braces. Fig. 5 is a transverse section through the seat, the cover being rolled up in its base; and Fig. 6 is a detail sectional view through one of the side flanges of the cover, illustrating the application thereto of a latch or lock adapted to hold the canopy-braces in upright position.

In carrying out the invention the seat comprises, primarily, a base A of box-like construction and a section B, upon which the driver is to be seated when the section is carried over upon the base, the two parts having a hinged connection, and the upper section of the seat is provided with the usual side flanges B' and back flange $B^2$. The box-base is divided, preferably, into two compartments, a small longitudinal compartment C and a larger longitudinal compartment C', the division being accomplished by means of a longitudinal partition 10. At one end of the box-base a vertical slot 11 is made, extending from the upper edge to a point at or near the bottom of the base, and in the opposite end of the said base a shallower and corresponding slot 12 is produced.

In the narrower compartment C, which is preferably located near the rear of the seat-base, a drum 13 is located, being adapted to have wound thereon a tarpaulin 14, and the said roller is preferably attached to or mounted upon the shaft 15, which is journaled in the ends of the box-base and extends outward beyond one end of the same, being provided at its projected end with a crank $15^a$ or its equivalent, whereby the tarpaulin may be unwound from or wound upon the said drum or roller, as occasion may require.

The canopy or top for the seat comprises side sections D and a top section E. The side sections consist of any desired number of braces, in the drawings three being illustrated, namely, a central brace 16 and a front and a rear brace 17. The central brace 16 is longer than the front and rear braces, and the front and rear braces are pivotally connected with the central brace 16 by attaching the lower ends of the front and rear braces to a plate 18, which is firmly secured to the central brace between its center and its lower end. The central brace above its plate 18 is provided with a sleeve 19, held to slide thereon, and the aforesaid sleeve is connected at opposite sides by links 20 and 21 with the front and rear braces 17, so that when the front and rear braces are folded outward at a desired angle to the center brace the links 20 and 21 will be straight, holding these outer braces in the aforesaid open position; but the outer braces 17 may be folded inward upon the central brace, in which event the sleeve 19 of the latter brace will slide upward and the links will occupy a diagonal position with reference to the braces, as shown in Fig. 2.

The lower end of the central brace of each side section of the canopy or top is pivotally attached to a shoe 22, and these shoes are secured at their lower ends by bolts or equivalent fastening devices to the outer faces of the ends of the base of the seat, one shoe being placed opposite one of the end slots 11 and 12 in the base. Preferably the shoes are of somewhat triangular form when viewed from the side, and at their upper ends the side pieces of the shoes are connected by straps $22^a$, as illustrated particularly in Fig. 2. Thus it will be observed that when the side sections of the top or canopy for the vehicle-seat are folded close together the folded sections may be carried downward within the larger compartment C' of the base, one on top of the other, as shown in Fig. 2, this arrangement of the folded sections of the top or canopy being provided for by the difference in depth of the slots 11 and 12 in the base of the seat.

The upper section of the vehicle top or canopy consists of a series of ribs. These ribs are designated as 23 and correspond in number to the number of braces employed in the construction of the side members of the canopy or top. Each of the ribs 23 is provided with an arched bar 24, preferably made of metal, pivotally attached to its ends, and each arched bar 24 terminates at its free end in a sleeve $24^a$, shaped to receive the upper end of a top or canopy brace, as shown in Fig. 4. The bars 24 may be termed "connecting-bars," since they unite the ribs of the canopy with its braces.

It is necessary that the connecting-bars should be locked securely to the braces, and to that end preferably the upper end of each brace is provided with a vertical slot 26, which extends into an angular recess 27, and in the sleeve or socket $24^a$ of each connecting-bar 24 a latch 25 is pivoted, as is likewise shown in Fig. 4. Preferably the latches 25 are of yoke-like construction, the end of one member being carried out beyond the outer face of the sleeve and shaped as a crank-arm. When the ribs are to be connected with the braces of the canopy, the latches are placed in perpendicular position, and after the latches have passed through the slots 26 they are turned so as to be brought into the undercut portions of the recesses 27, connected with the aforesaid slots.

It will be understood that the side aprons may remain attached to the braces of the canopy or vehicle-top when the said braces are carried downward into the base of the seat, and that the top covering attached to the ribs of the canopy and adapted for attachment to the back of the seat, as shown in dotted lines in Fig. 3, may remain attached to the said ribs when they are placed in the base portion of the seat. The ribs are placed one upon the other and occupy a position in the larger compartment or chamber C' of the base of the seat at the rear of the braces, as shown in Fig. 2.

In order that the canopy or vehicle-top may held in an upright position, a substantially inverted-U-shaped or yoke-shaped latch 28 is pivoted upon the outer face of each end flange B' of the base of the seat, the upper connecting portions $28^a$ of the members of the latches being horizontal, as illustrated in Fig. 6, and the horizontal head portions $28^a$ of the latches are adapted to enter chambers or compartments 29, formed in the upper edges of the end flanges of the seat, the said compartments being closed by a housing 30, and the head portions of the latches are so contained within the aforesaid housings that they cannot leave the same. In the upper portion of each housing 30 a locking-bolt 31 is located, and when the latches are carried inward, so that their outer members will be substantially flush with the outer faces of the end flanges of the seat, they may be so held by causing the bolts 31 to pass through the aforesaid heads, suitable grooves being made in the outer faces of the said flanges to admit of the member of the latch being flush with the outer faces of the flanges.

The latches are carried to their inner position when it is desired to fold the canopy at the rear of the seat, as illustrated in dotted lines in Fig. 3, but when the canopy is in its upright position over the seat the lower portions of the central braces 16 of the canopy will be received between the members of the latches 28, the latches being held in their outer position by causing the bolts 31 to practically engage with the inner end surfaces of the latch-heads, as shown in Fig. 6.

It is evident that under the construction above set forth a canopy or top for a vehicle may be expeditiously and conveniently folded out of sight in the base portion of the seat, and that the canopy may be as readily brought into position for use when it is desired. Furthermore, the tarpaulin will be found exceedingly convenient, being always at hand for the purpose of covering any articles that may be in the body of the vehicle, protecting them from the weather.

Having thus described my invention, I claim as new and desire to secure by Letters Patent—

1. A canopy or cover for vehicles, comprising side braces pivotally connected and provided with a device limiting their spread, and ribs removably connected with the said braces, as and for the purpose set forth.

2. A canopy or top for vehicles, consisting of side braces pivotally connected, a sleeve mounted to slide upon a central brace and having pivotal connection with the side braces, the said braces being provided with irregular recesses in their upper ends, and ribs adapted to connect corresponding braces, connecting-bars attached to the said ribs and provided with sleeves adapted to receive the upper ends of the braces, and latches arranged to enter the recesses in the said braces, as and for the purpose specified.

3. The combination, with a vehicle-seat, comprising a base and a seating-section, the base being of box-like construction, of a canopy the sides of which are arranged to fold, having a hinged connection with the seat-base, and ribs having a detachable connection with the aforesaid sides or braces, whereby the braces when collapsed may be folded down within the base of the seat and the ribs correspondingly placed within the aforesaid base, as and for the purpose specified.

4. The combination, with a seat comprising a base-section of box-like construction, having slots of different lengths in its ends, and a seating-section adapted to cover the base, of a canopy or cover comprising pivotally-connected side braces, shoes secured to the end portions of the base opposite the slots therein, a central brace at each side of the canopy having a hinged connection with the said shoes, and ribs connecting corresponding braces, having a locking engagement therewith yet being removable therefrom, whereby the entire canopy or cover may be folded within the base and beneath its seating-section, as set forth.

5. A vehicle-seat comprising a hollow base and a seating-section adapted to cover the base, a sectional canopy or cover attached to the base of the seat, the side members of the canopy having pivotal and guided connection, and a hinged connection with the base, the hinged connection being such as to enable the canopy to be folded within the base of the seat without detachment therefrom, as and for the purpose specified.

6. A vehicle-seat, and a sectional folding canopy attached to the said seat and arranged to drop below the seating portion of the seat, as and for the purpose set forth.

7. A vehicle-seat comprising a skeleton base, a seating-section adapted to cover the said base, a roller located within the base, means for turning the roller from the exterior of the base, and a folding canopy having a hinge connection with the base, the connection being such as to admit of the canopy being stored within the base below the seat portion thereof, substantially as described.

8. The combination, with a seat comprising a chambered base and a seating-section adapted to cover the said base, of a canopy comprising folding sides having a hinged connection with the sides of the base, detachable ribs connecting the sides of the canopy, and a keeper carried by the seating portion of the aforesaid seat and arranged to receive a member of the sides of the canopy, as and for the purpose set forth.

9. The combination, with a seat comprising a chambered base and a seating-section adapted to cover the said base, of a canopy comprising folding sides having a hinged connection with the sides of the base, detachable ribs connecting the sides of the canopy, and adjustable keepers located at the sides of the seat, said keepers being arranged to receive a member of the side portions of the canopy, and locking devices for the said keepers, whereby they may be held at a point beyond the outer face of the seating-section of the seat, or at a point practically within the plane of the said outer surface of the said seat, as and for the purpose specified.

ALVANES GRANT HENERY.

Witnesses:
FRANK HOLCOMB,
GEORGE S. COONER.